US010013358B2

(12) United States Patent
Tajima et al.

(10) Patent No.: US 10,013,358 B2
(45) Date of Patent: Jul. 3, 2018

(54) COMPUTER SYSTEM AND MEMORY ALLOCATION MANAGEMENT METHOD

(71) Applicant: HITACHI, LTD., Tokyo (JP)

(72) Inventors: Sachie Tajima, Tokyo (JP); Tadashi Takeuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 93 days.

(21) Appl. No.: 15/112,740

(22) PCT Filed: Jul. 24, 2014

(86) PCT No.: PCT/JP2014/069597
§ 371 (c)(1),
(2) Date: Jul. 20, 2016

(87) PCT Pub. No.: WO2016/013086
PCT Pub. Date: Jan. 28, 2016

(65) Prior Publication Data
US 2016/0335192 A1 Nov. 17, 2016

(51) Int. Cl.
G06F 12/00 (2006.01)
G06F 13/00 (2006.01)
(Continued)

(52) U.S. Cl.
CPC ...... G06F 12/0891 (2013.01); G06F 12/0815 (2013.01); G06F 12/0871 (2013.01);
(Continued)

(58) Field of Classification Search
CPC ............ G06F 12/0815; G06F 12/0871; G06F 12/0891; G06F 2212/1021; G06F 2212/1044; G06F 2212/152; G06F 2212/608; G06F 2212/657; G06F 2212/69

USPC ......................................................... 711/159
See application file for complete search history.

(56) References Cited

U.S. PATENT DOCUMENTS 5,809,560 A * 9/1998 Schneider ........... G06F 12/0862
711/202
9,632,931 B2 * 4/2017 Tajima ................ G06F 9/45558
(Continued)

FOREIGN PATENT DOCUMENTS

JP 2010033206 2/2010
WO 2012/111113 A1 8/2012

OTHER PUBLICATIONS

Arcangeli, A., et al., "Increasing memory density by using KSM," 2009 Linux Symposium, 2009, p. 19-28.

Primary Examiner — Sheng-Jen Tsai
(74) Attorney, Agent, or Firm — Volpe and Koenig, P.C.

(57) ABSTRACT

A computer system includes: a physical resource including a memory; a virtualization mechanism that provides a virtual computer to which the physical resource is allocated; and a cache state management mechanism that manages a cache state of the virtual computer. The virtualization mechanism provides a first virtual computer and a second virtual computer. The cache state management mechanism manages the cache state of each of the first virtual computer and the second virtual computer. When the cache state management mechanism detects transition of the cache state in a state where a memory area allocated to a cache of the first virtual computer and a memory area allocated to a cache of the second virtual computer include duplicated areas storing same data, the virtualization mechanism releases the duplicated area in one of the first virtual computer and the second virtual computer.

8 Claims, 11 Drawing Sheets

(51) Int. Cl.
*G06F 13/28* (2006.01)
*G06F 12/0891* (2016.01)
*G06F 12/0815* (2016.01)
*G06F 12/0871* (2016.01)

(52) U.S. Cl.
CPC ............... *G06F 2212/1021* (2013.01); *G06F 2212/1044* (2013.01); *G06F 2212/152* (2013.01); *G06F 2212/608* (2013.01); *G06F 2212/657* (2013.01)

(56) References Cited

U.S. PATENT DOCUMENTS

| | | | |
|---|---|---|---|
| 9,697,130 B2* | 7/2017 | Karippara | G06F 9/50 |
| 2009/0156303 A1* | 6/2009 | Kiely | G07F 17/32 463/29 |
| 2010/0023941 A1* | 1/2010 | Iwamatsu | G06F 12/109 718/1 |
| 2013/0097601 A1* | 4/2013 | Podvratnik | G06F 9/5027 718/1 |
| 2013/0198459 A1* | 8/2013 | Joshi | G06F 12/084 711/130 |
| 2013/0346975 A1* | 12/2013 | Okano | G06F 9/5016 718/1 |
| 2014/0013059 A1* | 1/2014 | Joshi | G06F 12/0815 711/144 |
| 2015/0254000 A1* | 9/2015 | Sivathanu | G06F 12/0868 711/103 |
| 2015/0358404 A1* | 12/2015 | Ayanam | G06F 9/4856 709/203 |
| 2015/0378892 A1* | 12/2015 | Tajima | G06F 9/45558 711/118 |
| 2015/0378921 A1* | 12/2015 | Karippara | G06F 9/45533 710/308 |

* cited by examiner

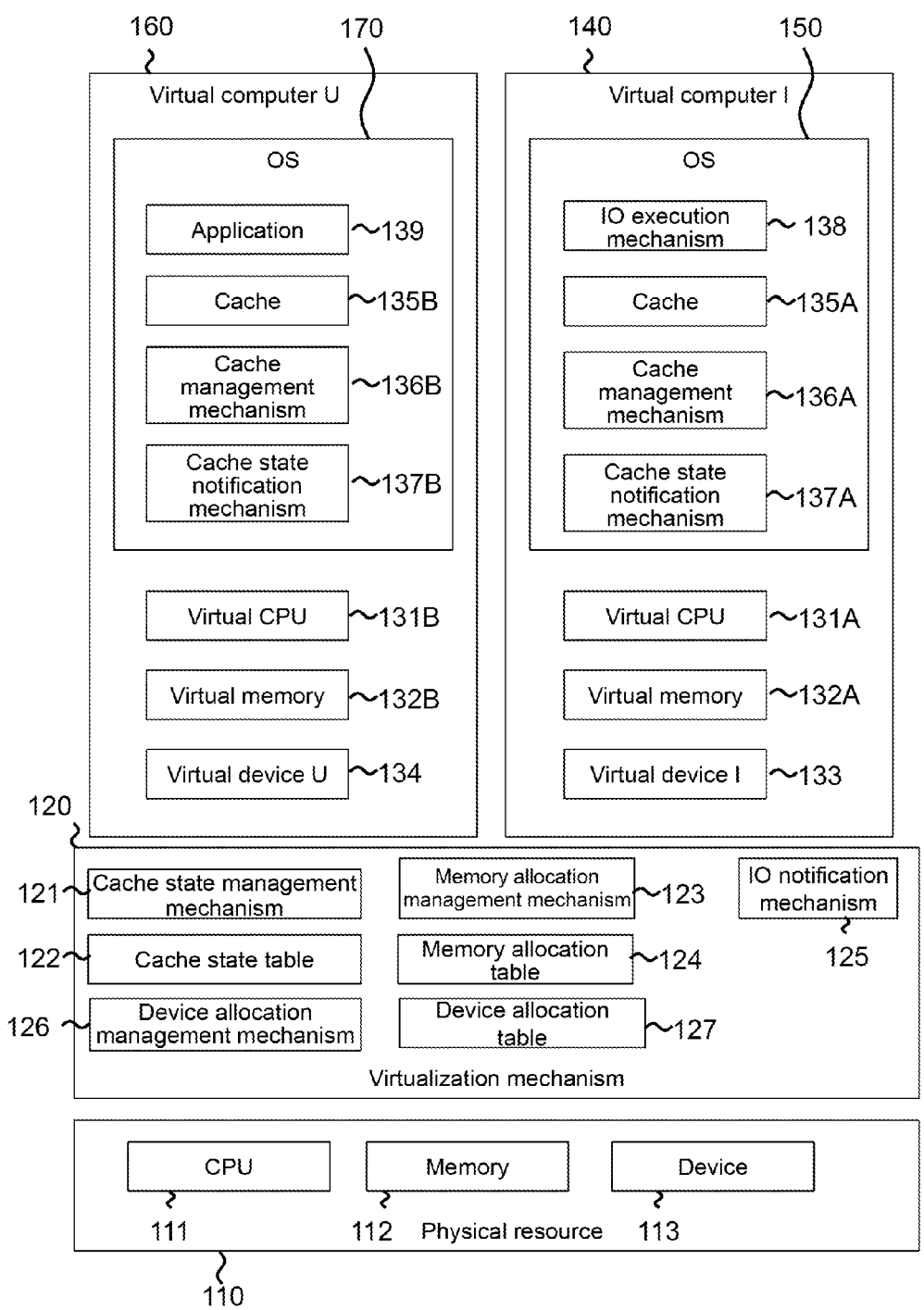

Fig. 2A

| Device ID | Device address | Computer ID | Address U | Address I | State U | State I |
|---|---|---|---|---|---|---|
| 1 | 1 | 2 | 120 | 100 | C | D |
| 2 | 10 | -- | -- | 240 | F | C |

Cache state table 122

Fig. 2B

| Physical address | Computer ID | Address |
|---|---|---|
| 101 | 1 | 100 |
| 102 | 2 | 120 |
| 103 | 2 | 140 |
| 104 | 1 | 240 |

Memory allocation table 124

Fig. 2C

| Device ID | Computer ID | Virtual Device ID |
|---|---|---|
| 1 | 2 | 1 |
| 2 | 3 | 1 |

Device allocation table 127

COMPUTER SYSTEM AND MEMORY ALLOCATION MANAGEMENT METHOD

TECHNICAL FIELD

The present invention relates to a technique of managing memory allocation to a virtual computer.

BACKGROUND ART

A technique in which an operation system (OS) operating on a computer adjusts memory allocation to improve memory usage efficiency has been known. For example, in a deduplication technique disclosed in NPL 1, the OS selects two unit areas from memory areas recognized by the OS, and compares data pieces of the two selected unit areas with each other. When the two unit areas store the same data, the OS determines that the two unit areas are duplicated, and merges the two unit areas. Thus, more efficient memory usage is achieved.

CITATION LIST

Non Patent Literature

[NPL 1]
Andrea Arcangeli, Izik Eidus, Chris Write, "Increasing memory density by using KSM", In Linux Symposium 2009, p-19-28

SUMMARY OF INVENTION

Technical Problem

In the deduplication technique disclosed in NPL 1, the processing of comparing a plurality of memory areas with each other imposes a large load on a CPU. Thus, when the deduplication processing is executed, the performance of the other processing might be affected.

When the memory areas that might be merged, that is, the memory areas to be compared, are large, a long period of time is required for the processing of comparing the memory areas with each other. As a result, the deduplication processing affects the performance of the other processing for a long period of time.

Due to the reasons described above, the deduplication processing cannot be frequently executed, and thus there has been a problem that a time during which the memory areas are not efficiently used is long.

An object of the present invention is to provide a technique of efficiently using memory areas with a small processing load.

Solution to Problem

A computer system according to an aspect for solving the problem includes: a physical resource including a memory; a virtualization mechanism that provides a virtual computer to which the physical resource is allocated; and a cache state management mechanism that manages a cache state of the virtual computer. The virtualization mechanism provides a first virtual computer and a second virtual computer. The cache state management mechanism manages the cache state of each of the first virtual computer and the second virtual computer. When the cache state management mechanism detects transition of the cache state, in a state where a memory area allocated to a cache of the first virtual computer and a memory area allocated to a cache of the second virtual computer include duplicated areas storing same data, the virtualization mechanism releases the duplicated area in one of the first virtual computer and the second virtual computer.

Advantageous Effects of Invention

According to the aspect of the present invention, the processing of checking whether there are duplicated areas is executed when the transition of the cache state that might change a result of the determination on whether there are the duplicated areas is detected. Thus, the duplication can be efficiently canceled without imposing a load of the processing of checking whether there are the duplicated areas more than necessary.

BRIEF DESCRIPTION OF DRAWINGS

FIG. 1 is a block diagram of a computer system according to a first embodiment.

FIG. 2A is a diagram showing a specific example of a cache state table 122.

FIG. 2B is a diagram showing a specific example of a memory allocation table 124.

FIG. 2C is a diagram showing a specific example of a device allocation table 127.

DESCRIPTION OF EMBODIMENTS

Figure 3:
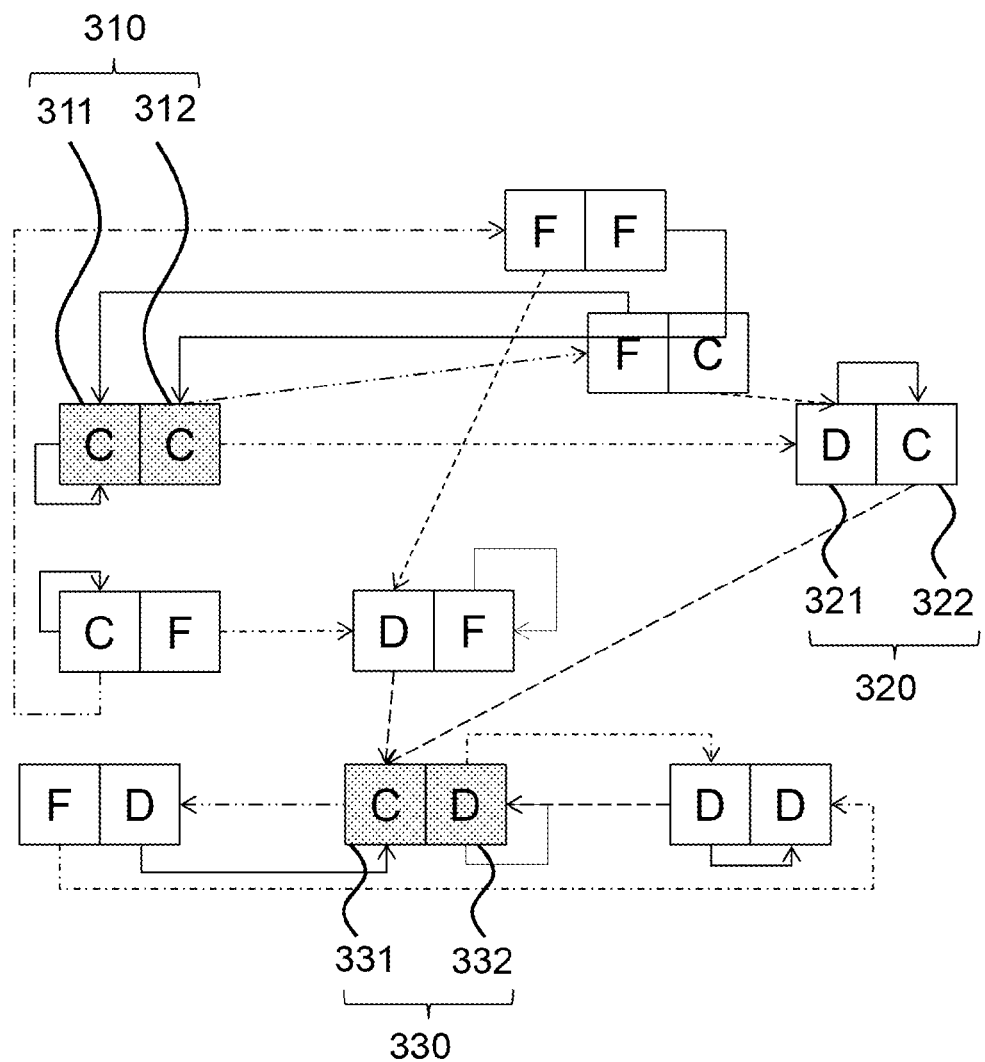
FIG. 3 is a diagram showing state transition of data, on a cache 135A of a virtual computer I 140 and on a cache 135B of a virtual computer U 160, corresponding to data stored in an area identified by a device address=1 in a device 113.

Exemplary configurations, functions, and the like according to embodiments of the present invention are described with reference to the drawings.

[First Embodiment]

FIG. 1 is a block diagram of a computer system according to a first embodiment.

The computer system includes a physical resource 110, a virtualization mechanism 120, a virtual computer I 140, and a virtual computer U 160. Although FIG. 1 illustrates an example where the number of virtual computer U 160 is one, the number of the virtual computer U 160 may be any number not smaller than one.

The physical resource 110 includes a CPU 111, a memory 112, and a device 113. The physical resource 110 may have a configuration in which the CPU 111, the memory 112, and the device 113 are accommodated in a single enclosure, or a configuration in which the CPU 111, the memory 112, and the device 113 are separately accommodated in a plurality of enclosures.

The virtualization mechanism 120 manages the virtual computer I 140 and the virtual computer U 160, and allocates the physical resource 110 to the virtual computer I 140 and the virtual computer U 160 under management.

For example, the virtualization mechanism 120 includes a memory allocation management mechanism 123 and a memory allocation table 124. The memory allocation management mechanism 123 is a mechanism that allocates a memory to the virtual computer I 140 and the virtual computer U 160. The memory allocation table 124 stores information indicating memory allocation states of the virtual computer I 140 and the virtual computer U 160.

The virtualization mechanism 120 includes a device allocation management mechanism 126 and a device allocation table 127. The device allocation management mechanism 126 allocates the device 113 to the virtual computer I 140 and the virtual computer U 160. The device allocation table 127 stores information indicating a device allocation state.

The virtualization mechanism 120 includes an IO notification mechanism 125, a cache state management mechanism 121, and a cache state table 122. The IO notification mechanism 125 notifies an IO request issued by the virtual computer U 160 to the virtual computer I 140. The cache state management mechanism 121 manages cache states of the virtual computer I 140 and the virtual computer U 160. The cache state table 122 stores information indicating the cache states of the virtual computer I 140 and the virtual computer U 160.

In the computer system of the present embodiment, the virtual computer U 160 is an application-executing virtual computer and the virtual computer I 140 is an IO-issuing virtual computer that issues the IO request to a target device based on the IO request from the virtual computer U 160. By thus separately providing the application-executing virtual computer and the IO-issuing virtual computer, the IO can be stably executed without being affected by the execution of the application. A plurality of application-executing virtual computers may be associated with a single IO-issuing virtual computer. Thus, the single IO-issuing virtual computer may be in charge of IO requests from the plurality of application virtual computers.

For example, a device recognized by an OS 170 of the virtual computer U 160 is the device provided by the physical resource 110 recognized by an OS 150 of the virtual computer I 140. The computer system executes an IO requested from an application on the virtual computer U 160 through the following flow of processing for example. Specifically, when cache hit fails in the virtual computer U 160, the virtualization mechanism 120 notifies the IO request from the virtual computer U 160 to the virtual computer I 140. The virtualization mechanism 120 further notifies the IO request issued by the virtual computer I 140, due to a failure of the cache hit in the virtual computer I 140, to a target device.

The virtual computer I 140 includes a virtual CPU 131A, a virtual memory 132A, and a virtual device I 133 as resources provided from the virtualization mechanism 120. The resources may be emulated in the virtualization mechanism 120 or may be the physical resource 110 directly allocated through the virtualization mechanism 120. In the virtual computer I 140, the OS 150 recognizes and operates the virtual CPU 131A, the virtual memory 132A, and the virtual device I 133.

The OS 150 includes an IO execution mechanism 138, a cache 135A, a cache management mechanism 136A, and a cache state notification mechanism 137A.

The IO execution mechanism 138 receives the IO request from the virtual computer U 160, and issues the IO request to the virtual device I 133. The cache 135A is a mechanism that stores IO data and improves an IO performance. The cache management mechanism 136A manages the cache 135A. The cache state notification mechanism 137 notifies a state change of the cache 135 to the virtualization mechanism 120.

The virtual computer U 160 includes a virtual CPU 131, a virtual memory 132, and a virtual device U 134 that are resources provided from the virtualization mechanism 120. The virtual CPU 131 and the virtual memory 132 may be resources emulated in the virtualization mechanism 120, or may be the physical resource 110 directly allocated through the virtualization mechanism 120. The virtual device U 134 is a resource emulated in the virtualization mechanism 120.

In the virtual computer U 160, the OS 170 recognizes and operates the virtual CPU 131B, the virtual memory 132B, and the virtual device U 134.

The OS 170 includes an application 139, a cache 135B, a cache management mechanism 136B, and a cache state notification mechanism 137B. The application 139 is software that provides various functions to the user, and issues the IO request in accordance with processing. The cache 135B is a mechanism that stores IO data and improves an IO performance. The cache management mechanism 136B manages the cache 135B. The cache state notification mechanism 137 notifies change of a state of the cache 135B to the virtualization mechanism 120.

FIG. 2A is a diagram showing a specific example of the cache state table 122. FIG. 2B is a diagram showing a specific example of the memory allocation table 124. FIG. 2C is a diagram showing a specific example of the device allocation table 127.

As shown in FIG. 2A, the cache state table 122 stores a device ID 211, a device address 212, a computer ID 213, an address U 214, an address I 215, a state U 216, and a state I 217.

The device ID 211 is an identifier of the device 113. The device address 212 is an identifier indicating a data storage position in the device 113 identified by the device ID 211. The computer ID 213 is an identifier for identifying the virtual computer U 160 when the data is stored in the cache 135B of the virtual computer U 160.

The address U 214 is an identifier indicating a data storage position in the cache 135B of the virtual computer U 160. The address I 215 is an identifier indicating the data storage position in the cache 135A when the data is stored in the cache 135A of the virtual computer I 140.

The state U 216 is a state of the cache identified by the address U 214. The state I 217 is a state of the cache identified by the address I 215.

The cache may be in three states of clean (C), dirty (D), and free (F). The clean state is a state in which the IO corresponding to data stored in the cache has been written to the device recognized by the OS, that is, a state in which the data in the cache and the data in the device match. The dirty state is a state in which the IO corresponding to the data stored in the cache has not been written to the device recognized by the OS, that is, a state in which the date in the cache and the data in the device do not match. The free state is a state in which data is not stored in the cache.

For example, data 210 in FIG. 2A shows that, in the device identified by the device ID=1, the data, corresponding to the data stored at a position identified by the device address=1, is stored at the address U=120 of the virtual computer U identified by the computer ID=2 in the clean state, and that the data is stored at the address I=100 of the virtual computer I in the dirty state.

As shown in FIG. 2B, the memory allocation table 124 stores a physical address 221, a computer ID 222, and an address 223.

The physical address 221 is an identifier indicating a data storage position in the memory 112.

The computer ID 222 is an identifier of the virtual computer to which a memory area is allocated. In the following description, the computer ID for identifying the virtual computer I 140 is assumed to be "1".

The address 223 is an identifier of the memory area, identified by the physical address 221, recognized by the virtual computer.

For example, data 220 in the figure indicates that the area identified by the physical address=101 in the memory 112 is allocated to an area on the memory identified by the address=100 of the virtual computer identified by the computer ID=1.

As shown in FIG. 2C, the device allocation table 127 stores a device ID 231, a computer ID 232, and a virtual device ID 233.

The device ID 231 is an identifier of the device 113.

The computer ID 232 is an identifier for identifying the virtual computer to which the device 113, identified by the device ID 231, is allocated.

The virtual device ID 233 is an identifier of device 113, identified by the device ID 231, recognized by the virtual computer.

For example, data 230 in FIG. 2C indicates that the device identified by the device ID=1 is allocated to the virtual computer identified by the computer ID=2, and the virtual computer recognizes the device as the device identified by the virtual device I=1

Figure 4:
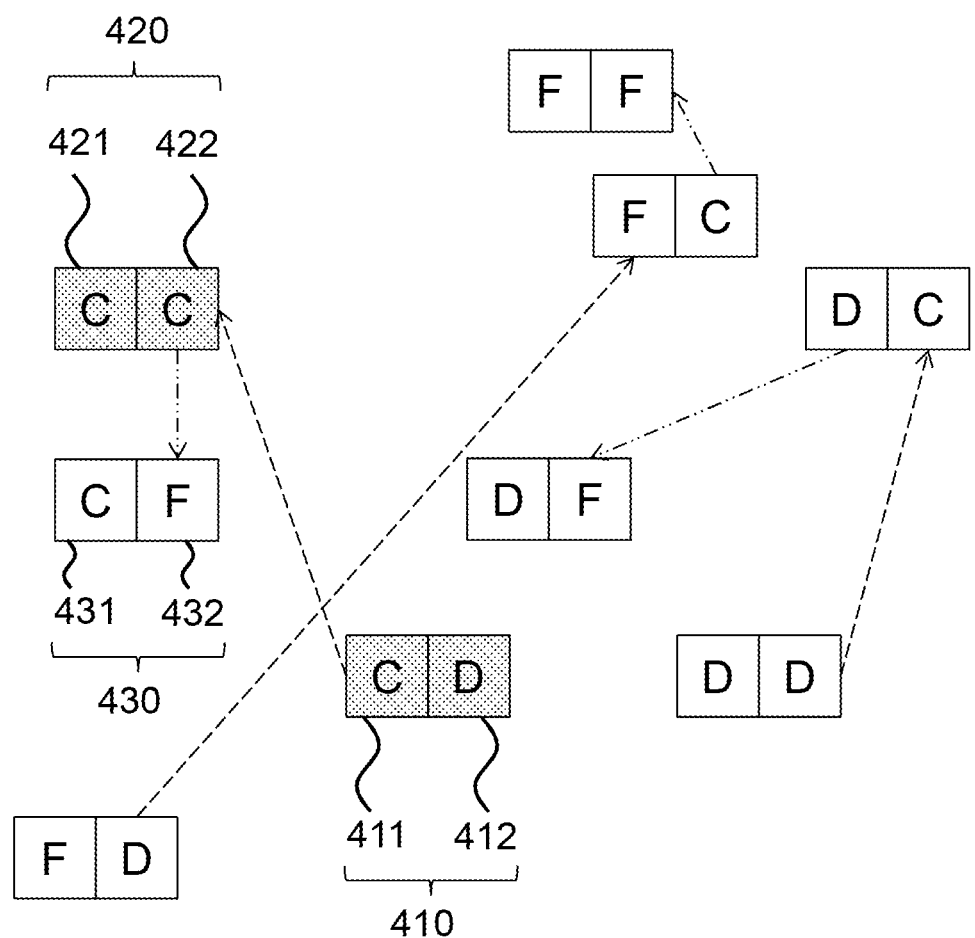
FIG. 4 is a diagram showing state transition of the data, on the cache 135A of the virtual computer I 140 and on the cache 135B of the virtual computer U 160, corresponding to the data stored in the area identified by the device address=1 in the device 113.

FIGS. 3 and 4 are diagrams showing state transition of data on the cache 135A of the virtual computer I 140 and the cache 135B of the virtual computer U 160 corresponding to the data stored in an area identified by the device address=1 in the device 113.

In FIGS. 3 and 4, of two boxes coupled to each other, the left box indicates the state of the virtual computer U 160 and the right side of the right box indicates the state of the virtual computer I 140. F indicates the free state, C indicates the clean state, and D indicates the dirty state. For example, the clean state of the virtual computer U 160 indicates that the data, in the cache of the virtual computer U 160, match the data in the cache of the virtual computer I 140. The clean state of the virtual computer I 140 indicates that the data, in the cache of the virtual computer I 140, matches the data in the device emulated by the virtualization mechanism 120 or the data in the device as the physical resource 110.

In FIGS. 3 and 4, hatched boxes indicate a state where the data in the cache of the virtual computer U 160 and the data in the cache of the virtual computer I 140 match, and thus the processing of releasing the cache of the virtual computer U 160 for deduplication of the data can be executed.

In FIGS. 3 and 4, a solid line arrow indicates state transition triggered by read, a dashed line arrow indicates state transition triggered by write, a one-dot chain line arrow indicates state transition triggered by destage, and two-dot chain line indicates state transition triggered by free. The triggers of the cache state transition are hereinafter also referred to as state transition triggers.

FIG. 3 shows state transition of the cache 135 caused by the state transition triggers that occur in the virtual computer U 160.

In a cache state 310, the cache state of the virtual computer U 160 is clean (311) and the cache state of the virtual computer I 140 is clean (312). In the cache state 310, the caches of the virtual computer U 160 and the virtual computer I 140 are in a state in which the deduplication can be executed.

The deduplication is processing of improving an efficiency of the physical memory usage through the following procedure. Specifically, when the same data is stored in a plurality of areas in the physical memory, any of the areas is released, and the address of the virtual computer, associated with the released area, is newly associated with another area storing the same data.

In the cache state 310, data in the cache 135B of the virtual computer U 160 and data in the cache 135A of the virtual computer I 140 match. Thus, the same data is stored in an area in the memory 112 of the physical resource 110 corresponding to the cache 135B and in an area of the memory 112 corresponding to the cache 135A. Thus, the cache state 310 can be regarded as a state where deduplication can be executed.

When the write request, as the state transition trigger, to the area identified by the device address=1 occurs in the virtual computer U 160, the cache state 310 transitions to a cache state 320 in which the cache state of the virtual computer U 160 is dirty (321) and the cache state of the virtual computer I 140 is clean (322).

The cache state 320 indicates the cache states of the virtual computer U 160 and the virtual computer I 140 in which the deduplication cannot be executed. This is because the data in the cache 135B of the virtual computer U 160 and the data in the cache 135A of the virtual computer I 140 do not match.

The write request, issued by the virtual computer U 160, is notified to the IO execution mechanism 138 of the virtual computer I 140 through the IO notification mechanism 125 of the virtualization mechanism 120 at a predetermined timing. This processing is referred to as destage.

Destage is one of the state transition triggers that causes the transition from the cache state 320 to the cache state 330 in which the cache state of the virtual computer U 160 is clean (331) and the cache state of the virtual computer I 140 is dirty (332). In the cache state 330, the deduplication can be executed on the caches of the virtual computer U 160 and the virtual computer I 140. This is because the data in the cache 135B of the virtual computer U 160 and the data in the cache 135A of the virtual computer I 140 match.

FIG. 4 shows state transition of the cache 135 caused by the state transition triggers that occur in the virtual computer I 140.

For example, in a cache state 410, the cache state of the virtual computer U 160 is clean (411) and the cache state of the virtual computer I 140 is dirty (412). In the cache state 410, the caches 135 of the virtual computer U 160 and the virtual computer I 140 are in the state in which the deduplication can be executed. This is because the data in the cache 135B of the virtual computer U 160 and the data in the cache 135A of the virtual computer I 140 match.

The virtual computer I 140 issues the IO request, received from the virtual computer U 160, to the virtual device I 133 at a predetermined timing. This processing is referred to as destage as one of the state transition triggers.

Destage causes the transition from the cache state 410 to a cache state 420 in which the cache state of the virtual computer U 160 is clean (421) and the cache state of the virtual computer I 140 is clean (422). The cache state 420 is also a state where the deduplication can be executed on the caches 135 of the virtual computer U 160 and the virtual computer I 140.

When an event such as the lack of unused memory area occurs in the virtual computer I 140, the virtual computer I 140 executes processing of releasing the memory area of the cache 135A to increase the unused memory area. This processing is referred to as free as one of the state transition triggers.

Free causes the transition from the cache state 420 to a cache state 430 in which the cache state of the virtual computer U 160 is clean (431) and the cache state of the virtual computer I 140 is free (432). In the cache state 430, the deduplication cannot be executed on the caches of the virtual computer U 160 and the virtual computer I 140. This is because the data is not stored in the cache 135A of the virtual computer I 140.

Figure 5:
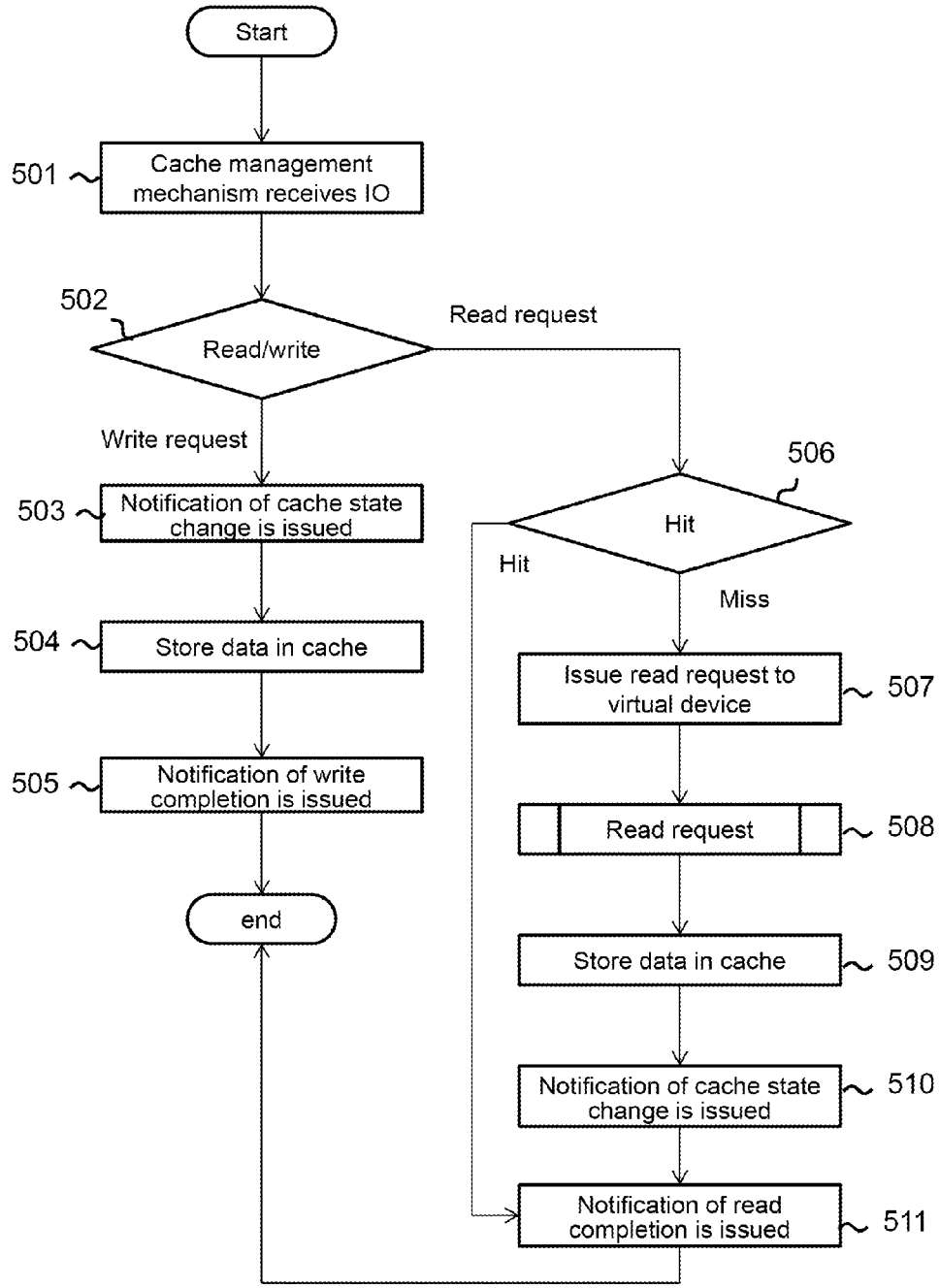
FIG. 5 is a flowchart showing IO processing in the virtual computer I 140 and the virtual computer U 160.

FIG. 5 is a flowchart showing IO processing in the virtual computer I 140 and the virtual computer U 160.

This processing is executed when the IO request occurs in the application 139 in the virtual computer U 160 and the IO execution mechanism 138 in the virtual computer I 140 receives the IO request.

Here, an example is described where the application 139 issues the IO request to an area corresponding to the device address=1 in the device 113 identified by the virtual device ID=1, or the IO execution mechanism 138 receives the IO request.

First, the cache management mechanism 136 receives the IO request issued by the application 139 or transmitted from the IO execution mechanism 138 (step 501).

When the IO request, received by the cache management mechanism 136, is a write request (a route for the write request from step 502), to store the data to be written to the area corresponding to the device address=1 in the device in the cache 135, the cache state notification mechanism 137 notifies the address for identifying the position of the cache and that the state of the cache transitions to dirty, to the cache state management mechanism 121 of the virtualization mechanism 120 (step 503). The cache management mechanism 136 stores the data in the cache 135 (step 504). Then, the cache management mechanism 136 notifies that the write request has been completed to the application 139 or the IO execution mechanism 138 (step 505). In the present embodiment, the cache state change may be notified to the cache state management mechanism 121 after the cache state has actually changed.

When the IO request, received by the cache management mechanism 136, is determined to be a read request in step 502 (a route for the read request from step 502), the cache management mechanism 136 checks whether the cache hit succeeds in the cache 135 with the data requested by the read request (step 506).

When the cache hit succeeds (step 506), the cache management mechanism 136 notifies that the read request has completed to the application 139 or the IO execution mechanism 138 (step 511).

When the cache hit fails (step 506), the cache management mechanism 136 issues the read request to the virtual device I 133 when the IO request has occurred in the virtual computer I 140, and to the virtual device U 134 when the IO request has occurred in the virtual computer U 160 (step 507). The virtual device I 140 or the virtual device U 160 that has received the read request executes the read request to acquire the data (step 508). The cache management mechanism 136 stores the data thus acquired in the cache 135 (step 509). The cache state notification mechanism 137 notifies an address for identifying a position on the cache 135 at which the data corresponding to the device address=1 is stored in the device and that the cache state is clean to the cache state management mechanism 121 of the virtualization mechanism 120 (step 510). The cache management mechanism 136 notifies that the read request has been completed to the application 139 or the IO execution mechanism 138 (step 511).

Figure 6:
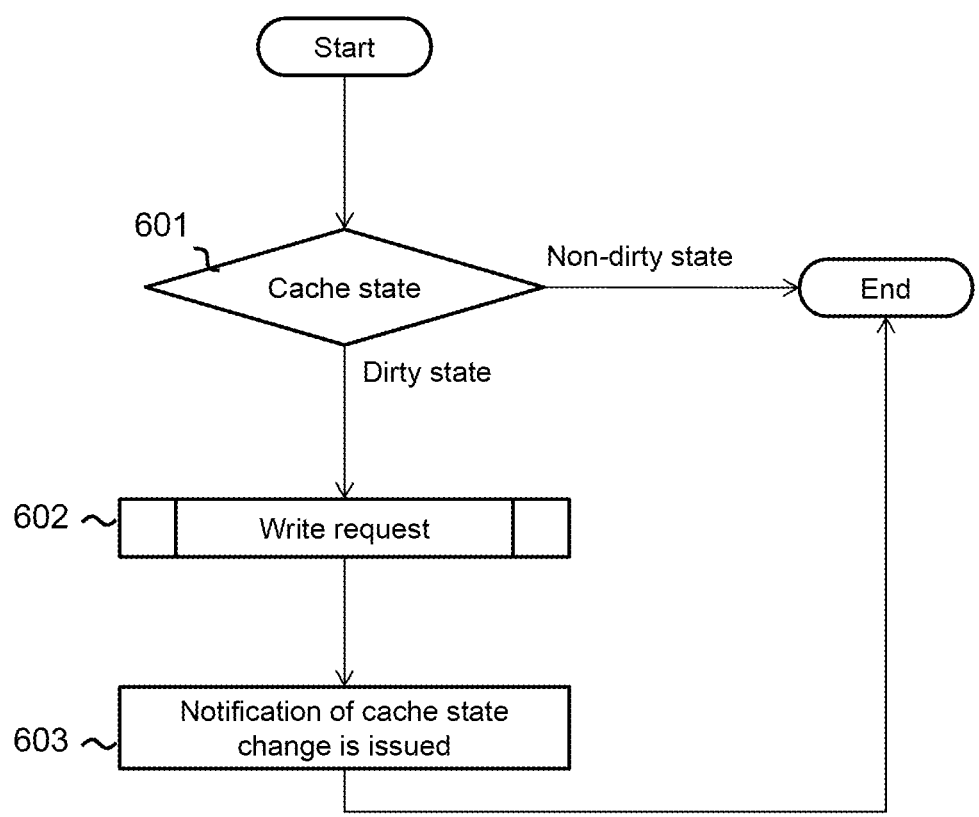
FIG. 6 is a flowchart showing write processing by the virtual computer I 140 and the virtual computer U 160.

FIG. 6 is a flowchart of write processing executed by the virtual computer I 140 and the virtual computer U 160. The write processing is processing of writing data, in a cache, to a device corresponding to the cache, in the dirty state. Through the processing, the dirty state of the cache transitions to the clean state. The processing is executed when a predetermined time or more elapses after the previous write processing, when a predetermined number of caches or more are in the dirty state, or when an indication is issued by the user.

The cache management mechanism 136 checks whether the cache 135 under management is in the dirty state. When the cache is not in the dirty state, the cache management mechanism 136 terminates the processing at this point (step 601).

When the cache 135 is in the dirty state (step 601), the write request requesting the data writing is issued to the virtual device I 133 when the processing is executed in the virtual computer I 140 and to the virtual device U 134 when the processing is executed in the virtual computer U 160 (step 602). Then, the cache state notification mechanism 137 notifies the virtual device ID for identifying the device as the IO issuing target, the device address, the address for identifying the position on the cache in which the data corresponding to the area is stored, and that the cache state is clean to the cache state management mechanism 121 of the virtualization mechanism 120 (step 603).

Figure 7:
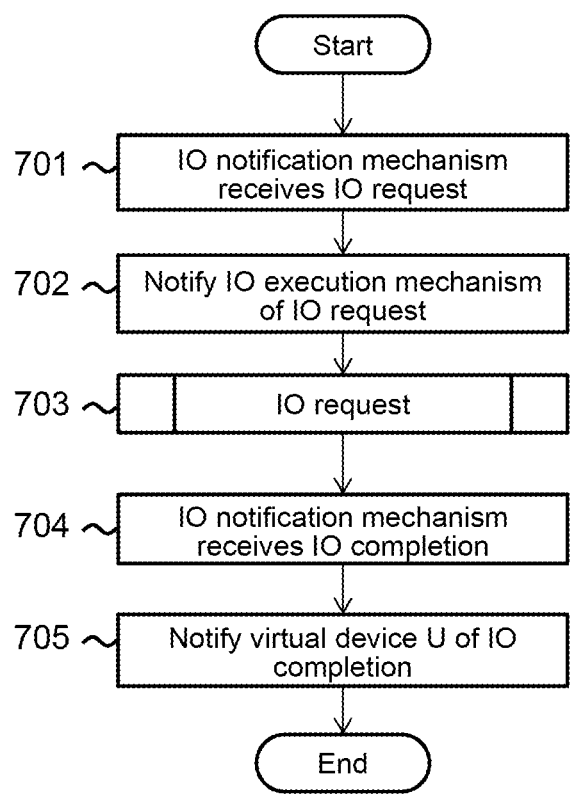
FIG. 7 is a flowchart showing processing for an IO request issued by the virtual computer U 160.

FIG. 7 is a flowchart showing processing for an IO request issued by the virtual computer U 160. The processing for the IO request is referred to as IO processing, which is the read processing in step 508 in FIG. 5 or the write processing in step 602 in FIG. 6.

As shown in FIG. 7, first, when an IO request is issued by the virtual device U 134 in the virtual computer U 160, the IO notification mechanism 125 on the virtualization mechanism 120 receives the IO request (step 701). The IO notification mechanism 125 that has received the IO request notifies the IO request to the IO execution mechanism 138 of the virtual computer I 140 (step 702).

The virtual computer I 140 processes the IO request in accordance with the flowchart in FIG. 5 (step 703). The virtual computer I 140 notifies that the IO processing has been completed as a result of the processing in FIG. 5, to the virtualization mechanism 120 through the IO execution mechanism 138.

The IO notification mechanism 125 of the virtualization mechanism 120 receives the completion of the IO processing from the IO execution mechanism 138 of the virtual computer I 140 (step 704). The IO notification mechanism 125 notifies the completion of the IO processing to the virtual device U 134 (step 705).

Figure 8:
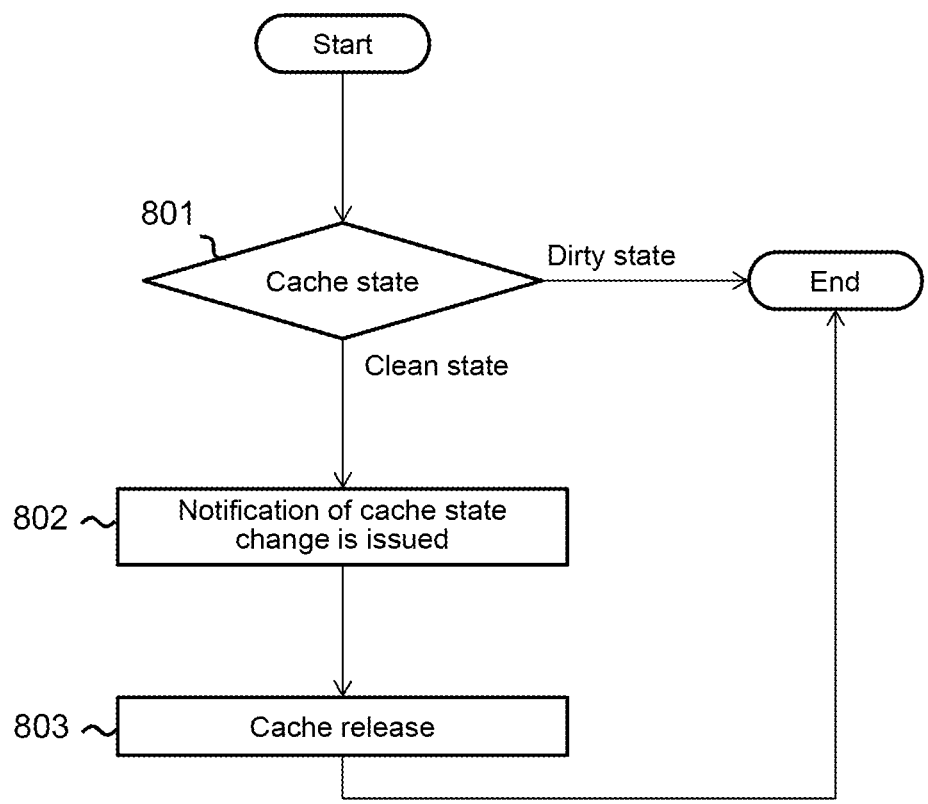
FIG. 8 is a flowchart showing cache release processing in the virtual computer I 140 and the virtual computer U 160.

FIG. 8 is a flowchart showing cache release processing in the virtual computer I 140 and the virtual computer U 160.

The processing is processing of increasing the unused memory area by releasing a currently using cache when the lack in an unused memory area and the like occurs in the virtual computer I 140 and the virtual computer U 160.

First, the cache management mechanism 136 checks the cache state of the cache 135 under management to determine whether the cache state is the clean state or the dirty state (step 801).

When the cache 135 is in the dirty state, the cache management mechanism 136 terminates the processing at this point (a route for the dirty state from step 801).

When the cache 135 is in the clean state, the cache state notification mechanism 137 notifies the address of the cache 135 and that the state of the cache 135 has changed to free to the cache state management mechanism 121 of the virtualization mechanism 120 (step 802). The cache management mechanism 136 releases the cache 135 (step 803).

Figure 9:
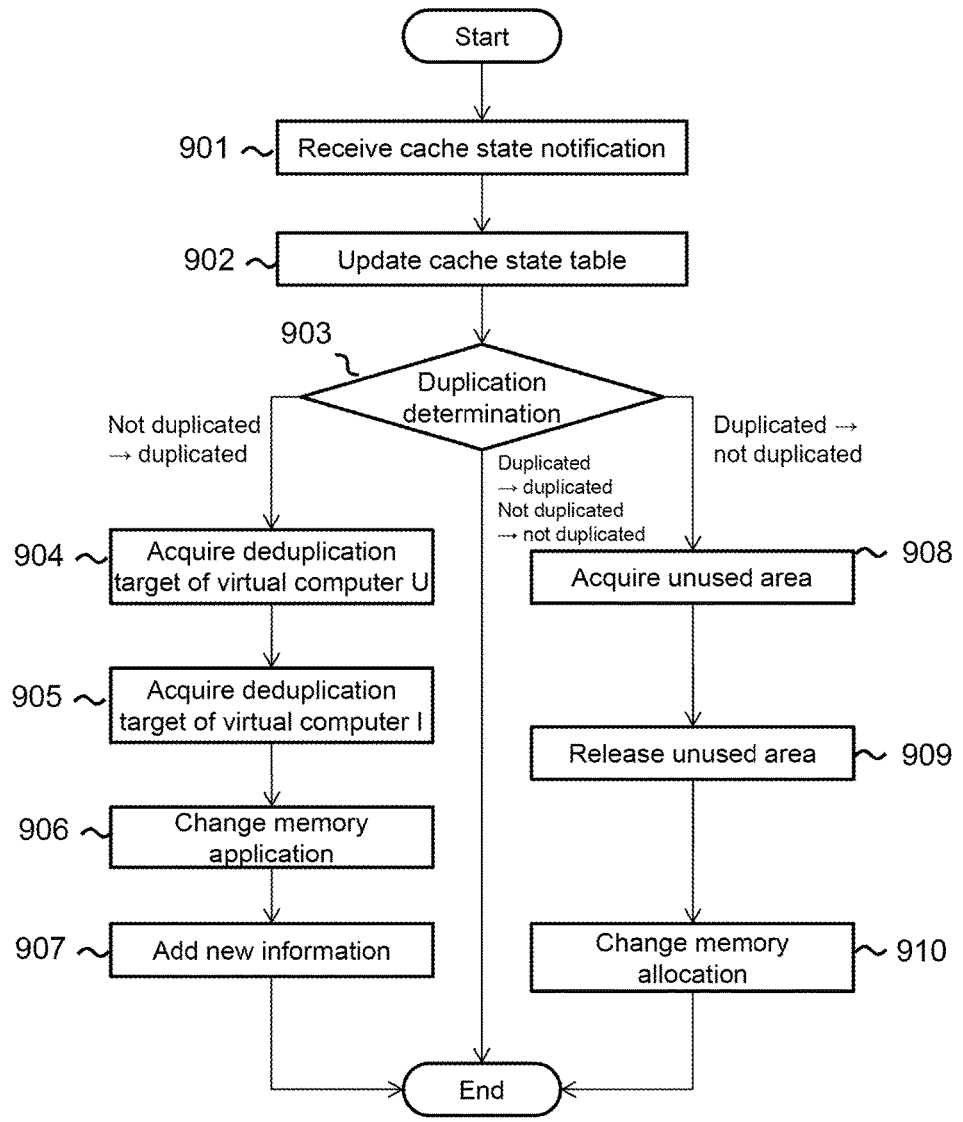
FIG. 9 is a flowchart showing processing of memory deduplication and canceling the deduplication.

FIG. 9 is a flowchart showing processing of memory deduplication and canceling the deduplication. The processing is executed when the transition of the cache state is notified from the cache state notification mechanism 137 of the virtual computer I 140 or the virtual computer U 160 to the cache state management mechanism 121 of the virtualization mechanism 120.

First, the cache state management mechanism 121 receives the notification indicating the cache state change in the virtual computer U 160 or the virtual computer I 140 from the cache state notification mechanism 137 of the virtual computer I 140 or the virtual computer U 160 (step 901). Upon receiving the cache state change, the cache state management mechanism 121 updates the cache state table 122 (step 902).

When the cache state U 216 and the cache state I 217 are both clean (the state 310 in FIG. 3) or the cache state U 216 is clean and the cache state I 217 is dirty (the state 330 in FIG. 3) in the cache state table 122, the cache state management mechanism 121 determines that a state (duplication state) is established in which the data in the area identified by the address I 215 in the virtual computer I 140 and the data stored in the area identified by the address U 214 in the virtual computer U 160 identified by the computer ID=213 are the same.

When the combination of the cache state U 216 and the cache state I 217 in the cache state table 122 is not clean and clean or clean and dirty, the cache state management mechanism 121 determines that a state (non duplication state) is established in which the data in the area identified by the address I 215 in the virtual computer I 140 and the data stored in the area identified by the address U 214 in the virtual computer U 160 identified by the device address 212 are different.

When the cache 135 transitions from the non duplication state to the duplication state due to the table update in step 902 (step 903), the deduplication processing is executed on the cache of the virtual computer I 140 storing the data and the cache of the virtual computer U 160 storing the data.

For example, a case is considered where a write request to an area identified by the device address=1 in the device 113 identified by the device ID=1 occurs in the virtual computer U 160 identified by the computer ID=2. Here, the IO processing shown in FIG. 5 is executed in the virtual computer U 160, and a cache state is established where the cache of the virtual computer U 160 is dirty and the cache of the virtual computer I 140 is clean. The cache state thus established is the cache state 320 in FIG. 3.

As shown in FIG. 6, the IO request is notified from the virtual computer U 160 to the IO notification mechanism 125 of the virtualization mechanism 120. The IO request is notified from the IO notification mechanism 125 to the IO execution mechanism 138 of the virtual computer I 140. Then, the IO processing is executed as show in FIG. 5 in the virtual computer I 140. Thus, a cache state is established where the cache of the virtual computer U 160 is clean and the cache of the virtual computer I 140 is dirty. The cache state thus established is the cache state 330 in FIG. 3.

When the state change is notified from the cache state notification mechanism 137 to the cache state management mechanism 121, the address U, the address I, the state U, and the state I, corresponding to the area of the device address=1 in the device identified by the device ID=1 in the cache state table 122, are set to be those in the data 210 in FIG. 2. Here, the state U and the state I in the data 210 transition from the non duplication state to the duplication state and thus the deduplication processing is executed.

The cache state management mechanism 121 acquires from the cache state table 122, the computer ID for identifying the virtual computer U 160 storing the cache as the deduplication target and the address U of the identifier of the cache of the virtual computer U 160.

Then, the cache state management mechanism 121 compares the computer ID 213 thus acquired and the computer ID 222 in the memory allocation table 124 and compares the address U 214 thus acquired with the address 223 in the memory allocation table 124. Thus, the cache state management mechanism 121 acquires the physical address corresponding to the cache as the address indicating the deduplication target (step 904). For example, the physical address corresponding to the address=120 of the computer ID=2 is "102".

The cache state management mechanism 121 acquires the address I as the identifier of the cache of the virtual computer I 140, from the cache state table 122. In the present embodiment, the computer ID of the virtual computer I 140 fixed to "1" is compared with the computer ID 222 in the memory allocation table 124, and the address I 215 thus acquired is compared with the address 223 in the memory allocation table. Thus, the physical address corresponding to the cache 135 is acquired as the address indicating the deduplication target (step 905). For example, the physical address corresponding to the address=100 of the computer ID=1 is "101".

As the deduplication processing, the memory allocation management mechanism 123 changes, in the memory allocation table 124, the physical address of the virtual computer U 160 acquired in step 904 to the physical address of the virtual computer I 140 acquired in step 905 (step 906). For example, the physical address corresponding to the address=120 of the computer ID=2 in the memory allocation table 124 is changed from "102" to "101". Thus, a state is established where the same physical address is allocated to both the virtual computer U 160 and the virtual computer I 140.

The memory allocation management mechanism 123 newly provides a different address to the area from which the allocation has been cancelled in step 906 described above, and adds the address to the memory allocation table 124 (step 907). Here, information indicating the physical address=102, the computer ID=2, and the address=200 may be added to the memory allocation table 124 for example, because the memory allocation table 124 stores no information corresponding to the address=200 of the computer ID=2.

When the cache state transitions from duplicated to not duplicated due to the table update in step 902 (step 903), the deduplication is cancelled in the deduplication state of the areas in the virtual computer I 140 and the virtual computer U 160.

For example, a state where the read request to the area identified by the device address=1 in the device identified by the device ID=1 in the virtual computer U 160 identified by the computer ID=2 is completed is considered. Here, the IO processing (read) shown in FIG. 5 is executed in the virtual computer U 160, and the state is established where the cache of the virtual computer U 160 and the cache of the virtual computer I 140 are both clean.

When the write request occurs thereafter to the area identified by the device address=1 in the device identified by the device ID=1 in the virtual computer U 160 identified by the computer ID=2, the IO processing (write) shown in FIG. 5 is executed, whereby a state is established where the cache of the virtual computer U 160 is dirty and the cache of the virtual computer I 140 is clean. This state change is notified from the cache state notification mechanism 137 to the cache state management mechanism 121.

For example, at this point, a state under deduplication is assumed to be established where the area identified by the physical address=101 is assumed to be allocated to both the area identified by the address=120 in the virtual computer U 160 identified by the computer ID=2 and the area identified by the address=100 in the virtual computer I 140.

The area identified by the address=120 in the virtual computer U 160 and the area identified by the address=100 in the virtual computer I 140 transition from the duplication state to the non duplication state due to the state change described above. Thus, the areas identified by different physical addresses need to be allocated to the address=120 in the virtual computer U 160 and the address=100 in the virtual computer I 140.

Thus, the cache state management mechanism 121 issues a notification to the cache management mechanism 136 of the virtual computer U 160 to acquire the address for identifying the area in the free state from the cache stored in the virtual computer U 160 (step 908). Here, for example, it is assumed that the address=140 is notified as the free area from the cache management mechanism 136B of the virtual computer U 160 identified by the computer ID=2.

The memory allocation management mechanism 123 compares the computer ID identifying the virtual computer U 160 set as the notification target in step 908 and the address thus acquired with the computer ID 222 and the address 223 in the memory allocation table 124, respectively. Thus, the memory allocation management mechanism 123 acquires the physical address to which the virtual computer U 160 and the address are allocated, and deletes the corresponding line from the memory allocation table (step 909). Here, as shown in the memory allocation table 124 in FIG. 2B, the area identified by the physical address=103 is allocated to the area identified by the address=140 in the virtual computer identified by the computer ID=2. Thus, the memory allocation line is deleted from the memory allocation table 124.

As the processing for cancelling the deduplication, the memory allocation management mechanism 123 changes the physical address corresponding to the address in the virtual computer U 160 that has been the deduplication target to the physical address acquired in step 909 in the memory allocation table 124 (step 910). For example, the physical address stored in the line identified by the address=120 of the computer ID=2 in the memory allocation table 124 is changed from "100" to "140".

When the duplication state or the non duplication state continues as a result of the state change in the cache state table 122 caused by the table update in step 902, the processing in FIG. 9 is terminated at this point.

As described above, in the present embodiment, when the memory area allocated to the cache 135B of the virtual computer U 160 (first virtual computer) and the memory area allocated to the cache 135A of the virtual computer I 140 (second virtual computer) include the duplicated areas storing the same data at a timing at which the cache state management mechanism 121 detects the transition of the cache state, the virtualization mechanism 120 releases the duplicated area of one of the virtual computer U 160 and the virtual computer I 140. In the present embodiment, the duplicated area in the virtual computer U 160 is released. Thus, the processing of checking whether there are the duplication areas is executed when the transition of the cache state, which might change the result of the determination on whether there are the duplicated areas, is detected. Thus, the timing of checking whether there are the duplication areas can be efficiently limited. Thus, the duplication can be efficiently cancelled without producing a processing load more than necessary.

The computer system of the present embodiment has the following configuration. Specifically, the virtual computer U 160 is an application-executing virtual computer. The virtual computer I 140 is an IO-issuing virtual computer that issues an IO request, based on the IO request from the virtual computer U 160, to a target device. The virtualization mechanism 120 notifies the IO request issued by the virtual computer U 160 to the virtual computer I 140 and notifies the IO request from the virtual computer I 140 to the target device. When there are the duplicated areas, the virtualization mechanism 120 releases the duplicated area in the virtual computer U 160, and allocates the duplicated area in the virtual computer I 140 to the cache of the virtual computer U 160.

As described above, when there are the duplicated areas in the computer system having the configuration, in which the virtual computer U 160 for application execution and the virtual computer I 140 for IO issuing to the device are in charge of the different functions, the duplicated area in the virtual computer U 160 for executing the application is released. The number of virtual computers U to be operated for executing the application, which is one in the above-described configuration of the present embodiment, may also be more than one. In such a case, a single virtual computer I may be in charge of the IO requests from the plurality of virtual computers U. Here, the virtual computer I executes the IO requests from the plurality of virtual computers U, and thus is required to have higher reliability than the virtual computer U. The mechanism can ensure the safety of the operation of the virtual computer I 140 for IO issuing.

The virtualization mechanism 120 determines that there are the duplicated areas when the cache states of the virtual computer U 160 and the virtual computer I 140 are both clean or when the cache state of the virtual computer U 160 is clean and the cache state of the virtual computer I 140 is dirty. Thus, whether there are the duplicated areas can be easily and correctly determined based on the cache states.

The cache state management mechanism 121 detects the transition of the cache state when read for reading data, write for writing data, destage for notifying a backend-side device of the data in the cache, or free for releasing the cache occurs in the virtual computer U 160 or the virtual computer I 140.

Thus, the transition of the cache state, triggered by the event of causing the transition of the cache state, can be easily and surely detected.

When the cache states of the virtual computer U 160 and the virtual computer I 140 are both clean, or when the cache state of the virtual computer U 160 is clean and the cache state of the virtual computer I 140 is dirty, it is determined that the duplication state is established. When the cache states of the virtual computer U 160 and the virtual computer I 140 are other states, it is determined that the non duplication state is established. When the cache state management mechanism 121 detects the transition of the cache state, the virtualization mechanism 120 releases the duplicated area in the virtual computer U 160, and allocates the duplicated area in the virtual computer I 140 to the cache of the virtual computer U 160 when the transition from the non duplication state to the duplication state has occurred. When the transition from the duplication state to the non duplication state has occurred, the cache of the virtual computer U 160, to which the duplicated area in the virtual computer I 140 has been allocated, is allocated with another area. Thus, the deduplication processing is executed when the transition from the duplication state to the non duplication state is detected. Furthermore, processing of cancelling the state under deduplication is executed when the transition from the non duplication state to the duplication state is detected. Thus, the deduplication can be appropriately applied.

Figure 10:
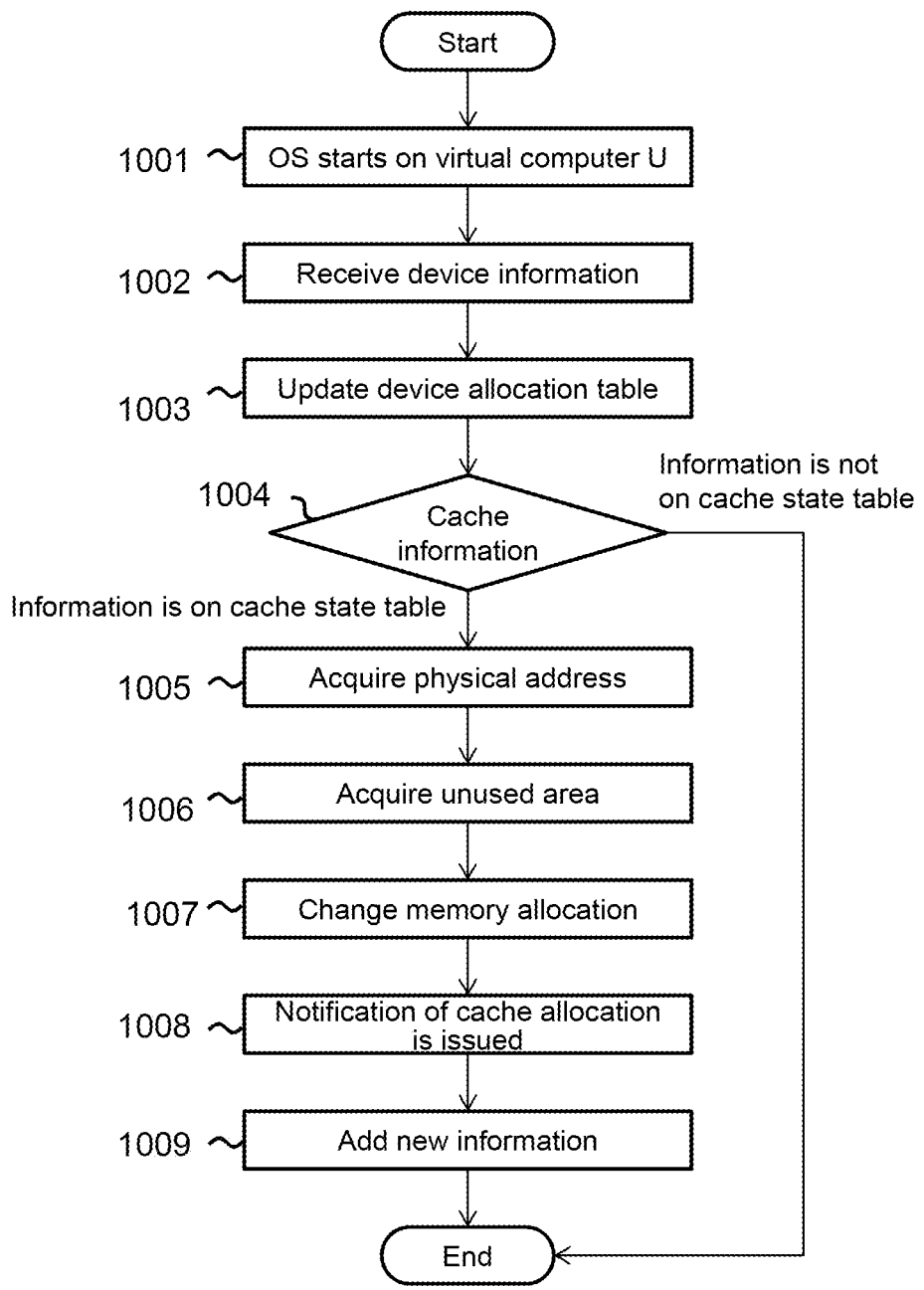
FIG. 10 is a flowchart showing memory allocation processing executed when an OS 170 is started on the virtual computer U 160.

FIG. 10 is a flowchart of memory allocation processing executed when the OS 170 is started on the virtual computer U 160.

When the OS 170 is started on the virtual computer U 160 (step 1001), first, the device allocation management mechanism 126 on the virtualization mechanism 120 receives from the virtual computer U 160, the device ID as the identifier of the device allocated to the virtual computer U 160, and the virtual device ID as the identifier of the device in the virtual computer U 160 (step 1002). Here, for example, the device identified by the device ID=2 is assumed to be allocated to the virtual computer U 160 identified by the computer ID=3, and the virtual computer U 160 is assumed to be recognizing the device with the virtual device ID=1.

The device allocation management mechanism 126 updates the device allocation table 127 (step 1003).

The device allocation management mechanism 126 determines whether information, corresponding to the device ID received in step 1002, is stored in the cache state table 122 (step 1004).

When the information, corresponding to the device ID received in step 1002, is not stored in the cache state table 122, the processing in FIG. 10 is terminated at this point.

When the information, corresponding to the device ID received in step 1002, is stored in the cache state table 122, the device allocation management mechanism 126 refers to the cache state table 122 and the memory allocation table 124 to acquire the physical address indicating where the information is stored (step 1005). For example, the address I 214 shows that the information stored in the area identified by the device address=10 in the device identified by the device ID=2 is stored in the address=240 of the virtual computer I 140. The memory allocation table 124 shows that the address=240 in the virtual computer I 140 identified by the computer ID=1 corresponds to the physical address=104. All things considered, it can be recognized that the information stored at the device address=10 in the device identified by the device ID=2 is stored at the physical address=104.

Then, the cache state management mechanism 121 reports a request to the cache management mechanism 136 of the virtual computer U 160 to receive the address of an area in the free state from the cache 135B stored in the virtual computer U 160 (step 1006). For example, it is assumed that the address=90 is notified as the free area from the cache management mechanism 136B of the virtual computer U 160 identified by the computer ID=3.

The memory allocation management mechanism 123 changes the physical address, corresponding to the address in the virtual computer U 160 acquired in step 1006, to the physical address acquired in step 1005, in the memory allocation table 124 (step 1007). For example, the physical address stored in the line identified by the address=90 of the computer ID=3 in the memory allocation table 124 is changed from "200" to "104". Thus, the allocation of the area at the physical address=200 is cancelled.

The cache state management mechanism 121 notifies the cache management mechanism 136B of the virtual computer U 160 of the cache information allocated in step 1007 (step 1008). For example, the cache state management mechanism 121 notifies that the information of the area, identified by the device address=2 in the device identified by the virtual computer U 160 with the virtual device ID=1, is stored in the area recognized by the virtual computer U 160 with the address=90 to the virtual computer U 160 identified by the computer ID=3.

The memory allocation management mechanism 123 newly allocates another address to the area of which the allocation has been cancelled in step 1007 and adds the address to the memory allocation table 124 (step 1009). For example, the information indicating the physical address=200, the computer ID=3, and the address=100 is added to the memory allocation table 124, when the memory allocation table 124 stores no information corresponding to the address=100 of the computer ID=3.

As described above, in the present embodiment, the cache state management mechanism 121 stores information indicating the cache state of the virtual computer U 160 in the cache state table 122, and the virtualization mechanism 120 restores the cache 135B of the virtual computer U 160 based on the information stored in the cache state table 122 when the OS 170 of the virtual computer U 160 is started. All things considered, the cache 135B is restored based on the cache state table 122 when the OS 170 is started, and thus can be effectively used immediately after the OS 170 is started.

[Second Embodiment]

A second embodiment is different from the first embodiment in the configuration of a portion corresponding to the virtualization mechanism 120 in the first embodiment. Here, the portion in the second embodiment different from the first embodiment is mainly described.

Figure 11:
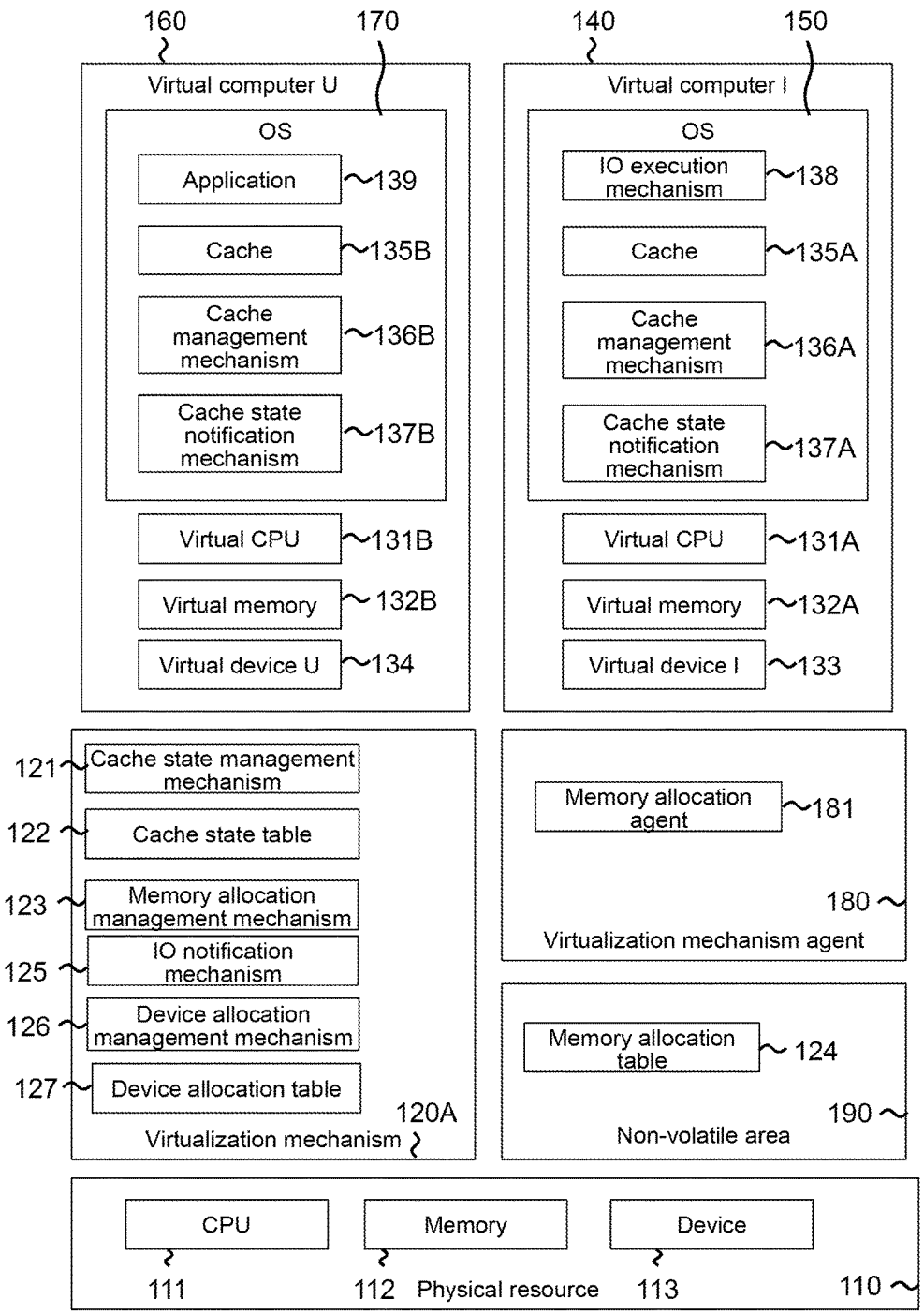
FIG. 11 is a block diagram of a computer system according to a second embodiment.

FIG. 11 is a block diagram showing a computer system according to the second embodiment. The portion in the second embodiment, corresponding to the virtualization mechanism 120 in the first embodiment, is divided into a virtualization mechanism 120A, a virtualization mechanism agent 180, and a non-volatile area 190.

The virtualization mechanism 120A includes the cache state management mechanism 121, the cache state table 122, the memory allocation management mechanism 123, the IO notification mechanism 125, the device allocation management mechanism 126, and the device allocation table 127. A memory allocation agent 181 is provided in the virtualization mechanism agent 180. The memory allocation agent 181 is a portion obtained by extracting a portion managing the memory allocation to the virtual computer I 140 from the functions the memory allocation to the virtualization mechanism 120 in the first embodiment. The memory allocation table 124, which is an element of the virtualization mechanism 120 in the first embodiment, is provided in the non-volatile area 190.

With the configuration, even when a failure occurs in the virtual computer U 160 or the virtualization mechanism 120A, the memory allocation agent 181 of the virtualization mechanism agent 180 and the memory allocation table 124 on the non-volatile area 190, which are separated from the virtualization mechanism 120A, are not affected by the failure. Thus, state information indicating memory allocation to the virtual computer I 140 by the virtualization mechanism agent 180 can be maintained. Thus, even when a failure occurs in the virtual computer U 160 or the virtualization mechanism 120A, the normal operation of the virtual computer I 140, which is used by at least one virtual computer U 160 and in charge of the IO request, can be maintained.

For example, an access to the cache state management mechanism 121 and the cache state table 122 might be disabled by the failure that has occurred in the virtualization mechanism 120A.

When the caches are in the duplication state, the physical address allocated to the virtual computer I 140 is also allocated to the virtual computer U 160, to reduce the memory usage amount. When the failure occurs in the virtualization mechanism 120A in this state, the access to the cache state management mechanism 121 and the cache state table 122 is disabled, and thus the memory allocation state of the virtual computer U 160 cannot be managed. Thus, a state is established where the operation of the virtual computer U 160 is not ensured.

In the present embodiment, the memory allocation to the virtual computer I 140 is not changed when the caches are in the duplication state as in the first embodiment. The memory allocation to the virtual computer I 140 is managed by the memory allocation agent 181 separated from the virtualization mechanism 120A. Thus, the operation of the virtual computer I 140 is ensured, even when the failure occurs in the virtualization mechanism 120A.

As described above, in the present embodiment, the virtual computer U 160 is the application-executing virtual computer and the virtual computer I 140 is the IO-issuing virtual computer that issues the IO request based on the IO request from the virtual computer U 160 to the target device, as in the first embodiment. In the present embodiment, the memory allocation agent 181, as the mechanism that manages the memory allocation to the virtual computer I 140, is configured to be independent from another mechanism (virtualization mechanism 120A). Thus, the operation of the virtual computer I 140 can be maintained even when the failure occurs in the virtual computer U 160 or mechanisms implementing other functions.

The embodiments of the present invention described above are only examples for describing the present invention, and there is no intension to limit the scope of the present invention to the embodiments. A person skilled in the art can implement the present invention in various ways without departing from the gist of the present invention.

REFERENCE SIGNS LIST

110 Physical resource
111 CPU
112 Memory
113 Device
120 Virtualization mechanism
120A Virtualization mechanism
121 Cache state management mechanism
122 Cache state table
123 Memory allocation management mechanism
124 Memory allocation table
125 IO notification mechanism
126 Device allocation management mechanism
127 Device allocation table
131 Virtual CPU
132 Virtual memory
134 Virtual device U
135 Cache
136 Cache management mechanism
137 Cache state notification mechanism
138 IO execution mechanism
139 Application
140 Virtual computer I
150 OS
160 Virtual computer U
170 OS
180 Virtualization mechanism agent
181 Memory allocation agent
190 Non-volatile area

The invention claimed is:

1. A computer system comprising:
a physical resource including a memory;
a virtualization mechanism that provides a virtual computer to which the physical resource is allocated; and
a cache state management mechanism that manages a cache state of the virtual computer, wherein
the virtualization mechanism provides a first virtual computer and a second virtual computer,
the cache state management mechanism manages the cache state of each of the first virtual computer and the second virtual computer,
when the cache state management mechanism detects transition of the cache state, in a state where a memory area allocated to a cache of the first virtual computer and a memory area allocated to a cache of the second virtual computer include duplicated areas storing same data, the virtualization mechanism releases the duplicated area in one of the first virtual computer and the second virtual computer,
wherein
the computer system has a configuration in which the first virtual computer is an application-executing virtual computer, the second virtual computer is an IO-issuing virtual computer that issues to a target device an IO request based on an IO request from the first virtual computer, and the virtualization mechanism notifies the second virtual computer of the IO request issued by the first virtual computer and notifies the target device of the IO request from the second virtual computer, and
when there are the duplicated areas, the virtualization mechanism releases the duplicated area in the first virtual computer and allocates the duplicated area in the second virtual computer to the cache of the first virtual computer.

2. The computer system according to claim 1, wherein when the cache states of the first virtual computer and the second virtual computer are both clean or when the cache state of the first virtual computer is clean and the cache state of the second virtual computer is dirty, the virtualization mechanism determines that there are the duplicated areas.

3. The computer system according to claim 1, wherein the cache state management mechanism detects the transition of the cache state, when read for reading data, write for writing data, destage for notifying a backend-side device of data in the cache, or free for releasing the cache occurs in the first virtual computer or the second virtual computer.

4. The computer system according to claim 1, wherein
a state where the cache states of the first virtual computer and the second virtual computer are both clean or where the cache state of the first virtual computer is clean and the cache state of the second virtual computer is dirty is defined as a duplication state, a state where the cache states of the first virtual computer and the second virtual computer are not the state is defined as a non duplication state, and
when the cache state management mechanism detects the transition of the cache states, the virtualization mechanism releases the duplicated area in the first virtual computer and allocates the duplicated area in the second virtual computer to the cache in the first virtual computer when transition from the non duplication state to the duplication state has occurred, and allocates another area to the cache in the first virtual computer, to which the duplicated area in the second virtual computer has been allocated, when the transition from the duplication state to the non duplication state has occurred.

5. The computer system according to claim 1, wherein
the cache state management mechanism stores information indicating the cache state of the first virtual computer in a cache state table, and
when an operation system of the first virtual computer is started, the virtualization mechanism restores the cache in the first virtual computer based on the information stored in the cache state table.

6. The computer system according to claim 1, wherein
the first virtual computer is an application-executing virtual computer and the second virtual computer is an IO-issuing virtual computer that issues to a target device an IO request based on an IO request from the first virtual computer, and a mechanism that manages memory allocation to the second virtual computer is configured to be independent from other mechanisms.

7. A memory allocation management method in a computer system including a physical resource including a memory, a virtualization mechanism that provides a virtual computer to which the physical resource is allocated, and a cache state management mechanism that manages a cache state of the virtual computer, the method managing memory allocation to a cache of the virtual computer, and the method comprising:
    operating the virtualization mechanism to provide a first virtual computer and a second virtual computer;
    operating the cache state management mechanism to manage , a cache state of each of the first virtual computer and the second virtual computer; and
    operating the virtualization mechanism to release, when the cache state management mechanism detects transition of the cache state in a state where a memory area allocated to a cache of the first virtual computer and a memory area allocated to a cache of the second virtual computer include duplicated areas storing same data, one of the duplicated areas in the first virtual computer and the second virtual computer,
wherein
the computer system has a configuration in which the first virtual computer is an application-executing virtual computer, the second virtual computer is an IO-issuing virtual computer that issues to a target device an IO request based on an IO request from the first virtual computer, and the virtualization mechanism notifies the second virtual computer of the TO request issued by the first virtual computer and notifies the target device the TO request from the second virtual computer, and
when there are the duplicated areas, the virtualization mechanism releases the duplicated area in the first virtual computer and allocates the duplicated area in the second virtual computer to the cache in the first virtual computer.

8. The memory allocation management method according to claim 7, wherein the cache state management mechanism stores information indicating the cache state of the first virtual computer in a cache state table, and
when an operation system of the first virtual computer is started, the virtualization mechanism restores the cache in the first virtual computer based on the information stored in the cache state table.

* * * * *